Patented Oct. 9, 1945

2,386,448

UNITED STATES PATENT OFFICE 2,386,448

PRODUCTION OF SYNTHETIC RUBBERS

Robert R. Dreisbach, Midland, Mich., assignor to The Dow Chemical Company, Midland, Mich., a corporation of Michigan No Drawing. Application July 11, 1940, Serial No. 344,959

12 Claims. (Cl. 204—158)

This invention concerns an improved method of polymerizing conjugated diolefines and mixtures thereof with other unsaturated compounds to obtain rubbery products of good quality. It involves the use of light of a certain quality as a catalyst for the polymerizations. It especially concerns the conjoint use of such light and a catalytic chemical agent, particularly a highly chlorinated hydrocarbon, to promote the reaction.

I am aware that light, particularly ultra-violet rays of wave lengths between about 2500 and 3000 angstrom units, is well known as a catalyst for polymerization reactions. I also am aware of U. S. Patent No. 1,898,522, which teaches that polychlorinated organic compounds containing 2 or more chlorine atoms on the same carbon atom are catalysts for the polymerization in aqueous emulsion of conjugated diolefines, alone or together with minor proportions of vinyl aromatic compounds, e. g. styrene. The polymerization reactions of the patent were evidently carried out in the dark, e. g. in a bomb or an autoclave, since light is not mentioned and the low boiling points of the diolefines employed precludes operation at atmospheric pressure.

I have found that light which is rich in wave lengths between 3000 and 6000 angstrom units, but which has been depleted of light of shorter wave lengths is an active catalyst for the polymerization of diolefines and the copolymerization of such compounds with other unsaturated organic compounds to produce rubbery products, but that light of shorter wave lengths, i. e. light of the quality usually considered most effective in promoting polymerization reactions, is highly detrimental. Light of the shorter wave lengths causes a reduction in the yield of rubbery material from the polymerization and impairs the quality of the product formed. Light of wave lengths greater than 6000 angstrom units is not detrimental. I have further found, when carrying such polymerizations out in aqueous emulsion, that light of the quality just recommended may be used conjointly with a highly chlorinated hydrocarbon containing 2 or more carbon atoms in the molecule to produce a catalytic effect which is far greater than the sum of their individual catalytic effects. In fact, although highly chlorinated hydrocarbons alone, i. e. without the coaction of light, are often effective in promoting the polymerization in emulsion of diolefines and of mixtures of diolefines with minor proportions of other polymerizable organic compounds, their effectiveness frequently decreases as the proportion of the polymerizable compound other than a diolefine is increased. When using both light of the quality above specified and a highly chlorinated hydrocarbon to promote the co-polymerization in emulsion of a diolefine and another polymerizable compound, a strong catalytic effect is obtained regardless of the proportions in which the reactants are employed.

Polymerizations in accordance with the invention are carried out in closed containers, e. g. in bombs or autoclaves, but with access of light of the quality hereinbefore specified, at temperatures between room temperature or thereabout and 100° C., preferably between 50 and 70° C. When using the light alone, or the light conjointly with another catalyst such as benzoyl peroxide which is soluble in the reaction mixture, the polymerization may be carried out in the presence or absence of a solvent or a diluent, e. g. benzene, toluene, higher paraffin hydrocarbons, aqueous solutions of emulsifying agents, etc., as desired. However, it is usually carried out in aqueous emulsion using the light conjointly with a catalytic chemical agent, e. g. a peroxide such as hydrogen peroxide, benzoyl peroxide, sodium or potassium perborate, or a highly chlorinated hydrocarbon, etc., as the reaction promoter. The polymerization is preferably carried out in aqueous emulsion using the light conjointly with a highly chlorinated hydrocarbon as the catalyst.

Examples of conjugated diolefines and mixtures thereof with other unsaturated organic compounds which may advantageously be polymerized in accordance with the invention are butadiene-1.3, isoprene, 2-chloro-butadiene-1.3, and mixtures of any one or more of said compounds with other polymerizable unsaturated organic compounds such as styrene, divinyl benzene, vinyl naphthalene, vinyl cyanide, methyl vinyl ketone, methyl isopropenyl ketone, ethyl vinyl ketone, ethyl isopropenyl ketone, etc.

As hereinbefore stated, the light employed should be rich in light of wave lengths between 3000 and 6000 angstrom units, i. e. it should be right in light of the longer wave lengths falling within the range known as ultra-violet light, but should be depleted of light of shorter wave lengths. Ordinary sunlight, or ultra-violet light from other sources, e. g. a mercury vapor lamp or a carbon electrode arc lamp, which has been filtered to remove therefrom most light of wave lengths less than 3000 angstrom units, is satisfactory, although light of the quality just stated which is somewhat more intense than filtered sunlight is preferred.

Examples of polychlorinated hydrocarbons which may be used conjointly with the light as a catalyst are hexachloroethane, pentachloroethane, tetrachloroethylene, hexachloropropylene, octachloropropane, hexachlorobenzene, tetrachlorobenzene, methyl-pentachlorobenzene, ethyl-pentachlorobenzeen, diethyl-tetra-chlorobenzene, etc. In general, polychlorinated hydrocarbons which are resistant to hydrolysis or other chemical change by boiling water, are preferably used, since the generation of hydrochloric acid in the reaction mixture is usually undesirable. In view of the fact that the catalytic effect obtained by the co-action of the light and such chlorinated hydrocarbon usually exceeds the sum of the catalytic effects of the light alone and of the chlorinated hydrocarbon alone, it appears that the light serves not only as a direct catalyst for the polymerization, but that it also activates, or promotes, the chlorinated hydrocarbon, thereby increasing its catalytic activity.

The invention is preferably practiced as follows. The compound or compounds to be polymerized and a small proportion, e. g. from 0.5 to 2 per cent by weight, of the polychlorinated hydrocarbon are mixed with an aqueous solution of an emulsifying agent and the mixture is agitated to effect emulsification. A number of emulsifying agents, e. g. egg albumen, soaps, sulphonic acids of aliphatic and alkyl-aromatic hydrocarbons of high molecular weight, sodium and potassium salts of such sulphonic acids, etc., which may be employed in preparing such emulsion are well known. The emulsifying agent is, of course, used in the proportion required to form a stable emulsion. Only a small proportion, e. g. from 1 to 3.5 per cent by weight of a sulfonate, based on the water present, is usually required.

The emulsion is warmed in a closed container, but under exposure to light of the quality hereinbefore specified, to a temperature between about 30° and 100° C., preferably between 50° and 70° C., to effect the polymerization. The reaction usually is substantially complete after from 10 hours to 3 days of heating.

The product may be recovered from the emulsion in any of the usual ways, e. g. by coagulation or by evaporation of the water. It usually resembles uncured rubber. It may be compounded with usual rubber-compounding agents, e. g. carbon black, fillers, anti-oxidants, accelerators, vulcanizing agents, etc., and cured to obtain a synthetic rubber of good quality.

The following examples describe certain ways in which the principle of the invention has been applied, but are not to be construed as limiting its scope.

EXAMPLE 1

The purpose of this example is to show that, when employing light alone as the catalyst in a polymerization involving a diolefine, the use of light which has been filtered to screen therefrom most light of wave lengths less than 3000 angstrom units results in the formation of a rubbery product superior to that obtained by carrying the polymerization out under exposure to light which is rich in wave lengths less than 3000 angstrom units, but under otherwise similar conditions. Two aqueous emulsions, each containing 5 grams of methyl isopropenyl ketone, 3 grams of butadiene, and 10 cubic centimeters of an aqueous solution of Turkey red oil, i. e. sulphonated castor oil, and Dreft (a mixture of sodium sulphate and sodium salts of higher monoalkyl sulphates) were heated in closed containers under exposure to light from a 400 watt mercury vapor arc lamp placed approximately 14 inches from the containers for about 40 hours. However, the light to which one of the emulsions was exposed passed through a quartz window which permitted transmission of the light of wave lengths less than 3000 angstrom units, whereas the light to which the other emulsion was exposed passed through a glass light-filter that screened out most light of wave lengths less than 3200 angstrom units. After completing the polymerizations, the containers were opened and water was evaporated under vacuum from the emulsions. The residual rubbery products were each devolatilized, i. e. treated to remove moisture and other volatile ingredients, by heating under vacuum at 100° C. for 2 hours, while gradually lowering the pressure to about 20 millimeters absolute. Each devolatilized product was compounded with 50 per cent of its weight of carbon black, 10 per cent of zinc oxide, 3 per cent of sulphur, 2 per cent of pine tar, 2 per cent of rosin, and 0.1 per cent of mercapto-thiazole. The compounded materials were rolled into sheets and cured by heating under pressure to 148° C. for 20 minutes. Standard test strips were cut from the cured sheets and were used to determine the tensile strength and the per cent ultimate elongation properties of the products as described in A. S. T. M. D 412–39T. Table I indicates which light-filter was used in each experiment and gives the tensile strength and per cent ultimate elongation properties of the products after compounding and curing the same.

*Table I*

| Run No. | Light-filter | Properties of cured products | |
|---|---|---|---|
| | | Tensile strength, lbs./sq. in. | Percent elongation |
| 1 | Quartz | 1,270 | 100 |
| 2 | Glass | 2,525 | 360 |

EXAMPLE 2

The purpose of this example is to present a series of experiments showing that light and a highly chlorinated hydrocarbon co-act to give a catalytic effect in promoting a polymerization in aqueous emulsion which is far greater than that obtained with either the light or the chlorinated hydrocarbon alone. Four experiments were carried out on the co-polymerization of butadiene-1.3 and methyl isopropenyl ketone in aqueous emulsion. The emulsions employed each contained 5 grams of methyl isopropenyl ketone, 3 grams of butadiene, and 10 cubic centimeters of an aqueous solution of Turkey red oil, i. e. sulphonated castor oil, and Dreft, i. e. a mixture of sodium sulphate and sodium salts of higher mono-alkyl sulphates, in concentrations of 3.5 per cent by weight of 1 per cent, respectively. Two of the emulsions also contained approximately 0.08 gram of hexachloroethane. One of the emulsions containing hexachloroethane and another emulsion which was free of said compound were heated with agitation in closed containers and in the absence of light at 60° C. for the periods of time given in the following table. The other two emulsions, only one of which contained hexachloroethane, were similarly heated except that they were exposed during heating to light from a mercury vapor arc lamp, which light had been passed through a light-filter which screened out most light of wave lengths less than 3200 angstrom units, but transmitted most light of longer wave lengths. The lamp employed to generate the light consumed approximately 400 watts of electric energy per hour and was placed about 14 inches from the emulsions. After completing the heating operations, the containers were opened and water was evaporated under vacuum from the emulsions. The residual rubbery products were each heated for 2 hours at 100° C. and at pressures which were gradually reduced to about 20 millimeters absolute pressure in order to evaporate any volatile ingredients, such as moisture and unreacted butadiene or methyl isopropenyl ketone. The products were then weighed to determine the yields. Each devolatilized product was compounded with 50 per cent of its weight of carbon black, 10 per cent of zinc oxide, 3 per cent of sulphur, 2 per cent of pine tar, 2 per cent of rosin, and 0.1 per cent of mercapto-thiazole. The compounded material was rolled into a sheet and cured by heating under pressure to 148° C. for 20 minutes. Standard test strips were cut from the cured sheet and were used to determine the tensile strength and the per cent ultimate elongation properties of the product as in Example 1. The following table indicates the presence or absence of hexachloroethane in each emulsion and whether polymerization by heating of the emulsion was carried out in the presence or absence of light. It also gives the time of heating required to effect the polymerization and the yield of devolatilized rubbery product, based on the combined weight of butadiene and methyl isopropyl ketone employed. The table includes the tensile strength and the per cent elongation properties of each product after compounding and curing the same.

*Table II*

| Run No. | Polymerizing conditions | | | Product | | |
|---|---|---|---|---|---|---|
| | $C_2Cl_6$ present | Light employed | Time of heating, hrs. | Yield | Properties after curing | |
| | | | | | Tensile strength, lbs./sq. in. | Percent elongation |
| 1 | No | No | 157 | 26.7 | 2,050 | 350 |
| 2 | Yes | No | 157 | 25.8 | 2,120 | 470 |
| 3 | No | Yes | 39 | 54.0 | 2,525 | 360 |
| 4 | Yes | Yes | 39 | 70.0 | 3,070 | 450 |

From the above data it will be seen that light alone of the quality employed is highly effective as a catalyst, but that the light and the chlorinated hydrocarbon when used conjointly are far more effective. It will also be seen that the conjoint use of the light and the chlorinated hydrocarbon promotes the formation of a rubbery co-polymer of superior quality to those obtained when using no catalyst or when carrying the polymerization out in the presence of either light alone or the chlorinated hydrocarbon alone.

EXAMPLE 3

This example presents comparative experiments showing that during a catalytic polymerization in the presence of a chlorinated hydrocarbon, the employment of unfiltered ultra-violet light, rich in wave lengths less than 3000 angstrom units, to promote the polymerization is detrimental, but that when the light is filtered to remove therefrom light of the shorter wave lengths, the remaining light is satisfactory and highly effective. Two emulsions were prepared, each containing 5 grams of methyl isopropenyl ketone, 3 grams of butadiene, 0.08 gram of hexachloroethane, and 10 cubic centimeters of an aqueous solution containing 3.5 per cent of Turkey red oil and 1 per cent of Dreft. The emulsions were brought to a pH of 8 by addition of dilute aqueous sodium hydroxide solution thereto. Each emulsion was heated with agitation at 60° C. for approximately 67 hours in a closed container and under exposure to light from a mercury vapor arc lamp placed equidistance from the two emulsions. However, the light to which one of the emulsions was exposed passed through a quartz window that permitted transmission of the light of valve lengths less than 3000 angstrom units, whereas the light to which the other emulsion was exposed entered through a glass window that screened out most light of wave lengths less than 3200 angstrom units, but transmitted most light of longer wave lengths. The rubbery polymers were separated, devolatilized, weighed, compounded, cured, and the strength and elongation properties of the cured products were determined, as in Example 1. Table III indicates which light-filter was used in each experiment and gives the per cent yield of devolatilized rubbery product and the tensile strength and per cent ultimate elongation properties of the product after compounding and curing the same.

*Table III*

| Run No. | Light-filter | Percent yield | Properties of cured products | |
|---|---|---|---|---|
| | | | Tensile strength, lbs./sq. in. | Percent elongation |
| 1 | Quartz | 60.3 | 750 | 100 |
| 2 | Glass | 92.5 | 2,350 | 520 |

EXAMPLE 4

The purpose of this example is to show that light of wave lengths of between 3000 and 3200 angstrom units or thereabout is particularly effective in promoting the polymerizations. Two emulsions, each of the same composition as those employed in Example 3, were heated in closed containers under exposure to light from the same source at a temperature of 60° C. for the times given in table IV. The difference between the two experiments was that the ultra-violet light entering one of the emulsions passed through a glass light-filter having the property of screening out most light of wave lengths less than 3000 angstrom units, whereas the light entering the other emulsion passed through a glass light-filter having the property of screening out most light of wave lengths less than 3200 angstrom units. Each filter transmitted most light of wave lengths greater than the values just given. After completing the polymerizations, the rubbery products were separated and devolatilized as in Example 1. Table IV identifies the light-filter used in each experiment by indicating the wave lengths of light which it readily transmits. The table also gives the time required for each polymerization and the yield of devolatilized rubbery product.

Table IV

| Run No. | Polymerization conditions | | Yield |
|---|---|---|---|
| | Light waves transmitted by filter-A | Time, hrs. | |
| 1 | 3,200 | 39 | 70 |
| 2 | 3,000 | 16.25 | 93 |

Example 5

Table V describes the results obtained in polymerizing a number of conjugated diolefines and mixtures thereof with other polymerizable organic compounds in accordance with the invention. In each experiment an aqueous emulsion was employed which contained 8 grams of the compound or compounds to be polymerized, approximately 0.8 gram of hexachloroethane and 10 cubic centimeters of an aqueous solution of 3.5 per cent of Turkey red oil and 1 per cent of Dreft. Each emulsion was brought to a pH of 8 with aqueous sodium hydroxide solution and then heated at 60° C. with agitation under exposure to ultra-violet light, which had been filtered to remove light of wave lengths less than 3000 angstrom units, for the time stated in the table. The rubbery polymerized product was then recovered and devolatilized as in Example 1. The table names the polymerizable compound or compounds employed in each experiment and gives the proportion of each as per cent by weight of all polymerizable compounds present. It also gives the time of heating employed for each polymerization and the per cent yield of rubbery polymerized product, based on the weight of polymerizable compounds employed.

Table V

| Run No. | Polymerizable compounds | | Time, hrs. | Yield, per cent |
|---|---|---|---|---|
| | Kinds | Percent | | |
| 1 | Butadiene | 100 | 64 | 88 |
| 2 | Butadiene | 40 | 64 | 96.5 |
| | Methyl isopropenyl ketone | 60 | | |
| 3 | Butadiene | 60 | 64 | 90 |
| | Methyl isopropenyl ketone | 40 | | |
| 4 | Butadiene | 80 | 64 | 93 |
| | Methyl isopropenyl ketone | 20 | | |
| 5 | Isoprene | 37.5 | 66 | 81.5 |
| | Methyl isopropenyl ketone | 62.5 | | |
| 6 | Butadiene | 20 | 64 | 85.6 |
| | Isoprene | 20 | | |
| | Methyl isopropenyl ketone | 60 | | |
| 7 | Butadiene | 25 | 65 | 100 |
| | Methyl isopropenyl ketone | 31.2 | | |
| | Vinyl cyanide | 43.8 | | |
| 8 | Butadiene | 35 | 65 | 90 |
| | Methyl isopropenyl ketone | 40 | | |
| | Vinyl cyanide | 18.75 | | |
| | Vinylidene chloride | 6.25 | | |
| 9 | Butadiene | 25 | 65 | 97.5 |
| | Methyl isopropenyl ketone | 25 | | |
| | Vinyl cyanide | 25 | | |
| | Styrene | 25 | | |

Other modes of applying the principles of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for making a rubbery material by the co-polymerization in aqueous emulsion of a mixture of unsaturated organic compounds, including a conjugated aliphatic diolefine and an unsaturated ketone, the conjugated aliphatic diolefine being present in amount corresponding to at least 20 per cent of the combined weight of all polymerizable organic compounds in the mixture, the steps which consist in carrying the polymerization out at a temperature between 30° and 100° C. in the presence of a small proportion of a polychlorinated hydrocarbon, which contains at least 2 carbon atoms in the molecule and is stable in the presence of boiling water, and under exposure to actinic light which is rich in light of wave lengths between 3000 and 6000 angstrom units but which has been filtered substantially to remove therefrom light of wave lengths less than 3000 angstrom units.

2. The method which comprises forming an aqueous emulsion of a conjugated aliphatic diolefine, a polymerizable unsaturated ketone, and a polychlorinated hydrocarbon, which contains at least 2 carbon atoms in the molecule and is stable in the presence of boiling water, the ketone being present in amount corresponding to between 55 and 70 per cent of the combined weight of said ketone and the diolefine, and the chlorinated hydrocarbon being present in relatively small proportion; and heating the emulsion at a temperature between about 50° and about 70° C. under exposure to actinic light which is rich in light of wave lengths between 3000 and 6000 angstrom units but which has been filtered substantially to remove therefrom light of wave lengths less than 3000 angstrom units, whereby a rubbery co-polymer is formed.

3. In a method of making a rubbery material, wherein a conjugated aliphatic diolefine and an unsaturated ketone are co-polymerized while in aqueous emulsion at temperatures between 30° and 100° C., the conjugated aliphatic diolefine being present in amount corresponding to at least 20 per cent of the combined weight of all polymerizable organic compounds in the mixture, the step which consists in carrying the polymerization out under exposure to actinic light which is rich in light of wave lengths between 3000 and 6000 angstrom units but which has been filtered substantially to remove therefrom light of wave lengths less than 3000 angstrom units.

4. In a method for making a rubbery material by the co-polymerization in aqueous emulsion of a conjugated aliphatic diolefine and an unsaturated ketone, the conjugated aliphatic diolefine being present in amount corresponding to at least 20 per cent of the combined weight of all polymerizable organic compounds in the mixture, the step which consists in carrying the polymerization out in a closed container at temperatures between 50° and 70° C. in the presence of a polychlorinated hydrocarbon, which contains at least 2 carbon atoms in the molecule and is stable in the presence of boiling water, and under exposure to actinic light which is rich in light of wave lengths between 3000 and 6000 angstrom units but which has been filtered substantially to remove therefrom light of wave lengths less than 3000 angstrom units and thereafter separating the rubbery polymerization product.

5. In a method for making a rubbery material by the co-polymerization, in aqueous emulsion, of butadiene and an unsaturated ketone, the conjugated aliphatic diolefine being present in amount corresponding to at least 20 per cent of the combined weight of all polymerizable organic compounds in the mixture, the step which consists in carrying the polymerization out at temperatures between 30° and 100° C. under exposure to actinic light which is rich in light of wave lengths between 3000 and 6000 angstrom units but which has been filtered substantially to remove therefrom light of wave lengths less than 3000 angstrom units.

6. In a method for making a rubbery material by the co-polymerization, in aqueous emulsion, of butadiene and methyl isopropenyl ketone, the conjugated aliphatic diolefine being present in amount corresponding to at least 20 per cent of the combined weight of all polymerizable organic compounds in the mixture, the step which consists in carrying the polymerization out at temperatures between 30° and 100° C. under exposure to actinic light which is rich in light of wave lengths between 3000 and 6000 angstrom units but which has been filtered substantially to remove therefrom light of wave lengths less than 3000 angstrom units.

7. In a method for making a rubbery material by the co-polymerization in aqueous emulsion of butadiene and methyl isopropenyl ketone, the conjugated aliphatic diolefine being present in amount corresponding to at least 20 per cent of the combined weight of all polymerizable organic compounds in the mixture, the step which consists in carrying the polymerization out at temperatures between 30° and 100° C. in the presence of a small proportion of a polychlorinated hydrocarbon, which contains at least 2 carbon atoms in the molecule and is stable in the presence of boiling water, and under exposure to actinic light which is rich in light of wave lengths between 3000 and 6000 angstrom units but which has been filtered substantially to remove therefrom light of wave lengths less than 3000 angstrom units.

8. The method which comprises forming an aqueous emulsion of butadiene, methyl ispropenyl ketone, and a polychlorinated hydrocarbon, which contains at least 2 carbon atoms in the molecule and is stable in the presence of boiling water, the methyl isopropenyl ketone being present in amount corresponding to between 55 and 70 per cent of the combined weight of said ketone and the butadiene, and the polychlorinated hydrocarbon being present in relatively small proportion, heating the emulsion to temperatures between 50° and 70° C. in a closed container under exposure to actinic light which is rich in light of wave lengths between 3000 and 6000 angstrom units but which has been filtered substantially to remove therefrom light of wave lengths less than 3000 angstrom units, and thereafter separating the rubbery polymerization product.

9. In a method wherein a rubbery product is prepared by the polymerization of unsaturated organic material which initially contains a conjugated aliphatic diolefine in amount corresponding to at least 20 per cent of the combined weight of all polymerizable compounds present, the step which consists in carrying the polymerization out in liquid phase at temperatures between 30° and 100° C. under exposure to actinic light which is rich in light of wave lengths between 3000 and 6000 angstrom units but which has been filtered substantially to remove therefrom light of wave lengths less than 3000 angstrom units.

10. In a method wherein a rubbery product is prepared by the polymerization of unsaturated organic material which initially contains a conjugated aliphatic diolefine in amount corresponding to at least 20 per cent of the combined weight of all polymerizable compounds present, the step which consists in carrying the polymerization out in aqueous emulsion at temperatures between 30° and 100° C. under exposure to actinic light which is rich in light of wave lengths between 3000 and 6000 angstrom units but which has been filtered substantially to remove therefrom light of wave lengths less than 3000 angstrom units.

11. In a method wherein a rubbery product is prepared by the polymerization of unsaturated organic material which initially contains a conjugated aliphatic diolefine in amount corresponding to at least 20 per cent of the combined weight of all polymerizable compounds present, the step which consists in carrying the polymerization out in aqueous emulsion at a temperature between 30° and 100° C. in the presence of a small proportion of a catalytic chemical agent for the polymerization and under exposure to actinic light which is rich in light of wave lengths between 3000 and 6000 angstrom units but which has been filtered substantially to remove therefrom light of wave lengths less than 3000 angstrom units.

12. In a method wherein a rubbery product is prepared by the polymerization of unsaturated organic material which initially contains a conjugated aliphatic diolefine in amount corresponding to at least 20 per cent of the combined weight of all polymerizable compounds present, the step which consists in carrying the polymerization out in aqueous emulsion at a temperature between 30° and 100° C. in the presence of a small proportion of a polychlorinated hydrocarbon which contains at least two carbon atoms in the molecule and is stable in the presence of boiling water, and under exposure to actinic light which is rich in light of wave lengths between 3000 and 6000 angstrom units but which has been filtered substantially to remove therefrom light of wave lengths less than 3000 angstrom units.

ROBERT R. DREISBACH.